Aug. 28, 1934.　　　　E. F. ZAPARKA　　　　1,971,592
AILERON AND FLAP CONSTRUCTION
Filed July 21, 1933　　　7 Sheets-Sheet 1
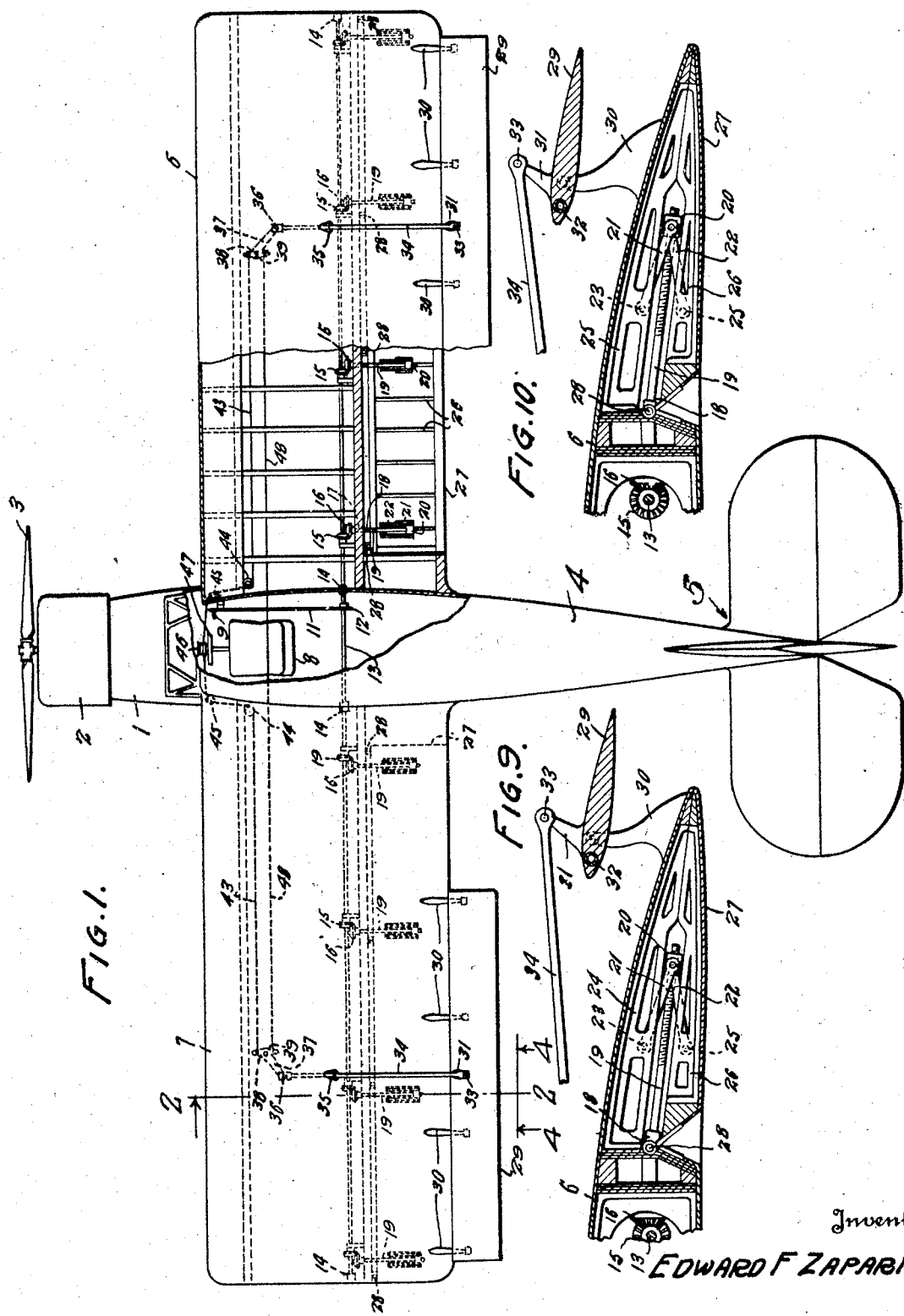
Inventor
EDWARD F ZAPARKA
By Semmes & Semmes
Attorneys Aug. 28, 1934.　　　E. F. ZAPARKA　　　1,971,592
AILERON AND FLAP CONSTRUCTION
Filed July 21, 1933　　　7 Sheets-Sheet 2
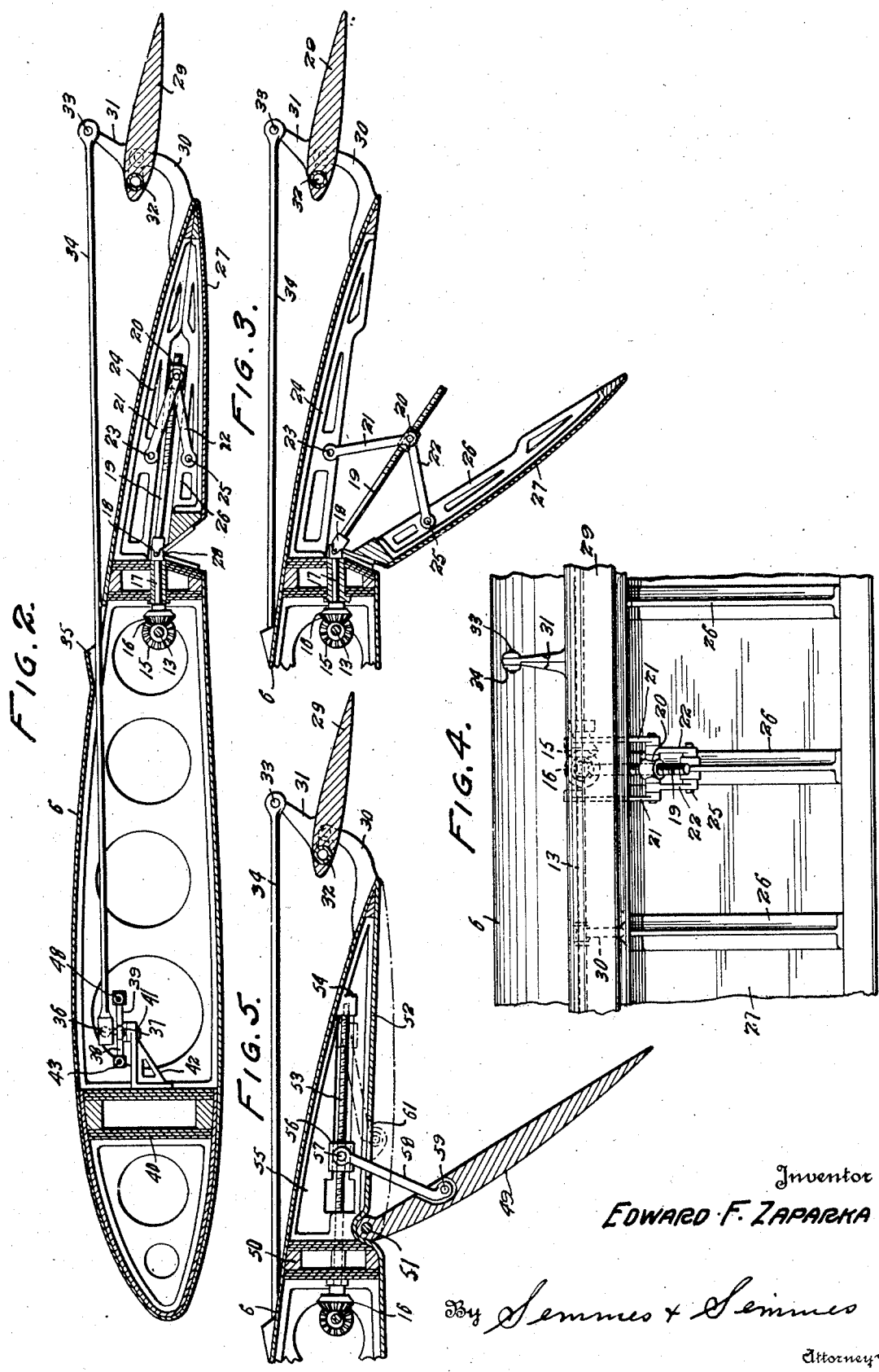
Inventor
EDWARD F. ZAPARKA
By Semmes & Semmes
Attorneys Aug. 28, 1934.  E. F. ZAPARKA  1,971,592
AILERON AND FLAP CONSTRUCTION
Filed July 21, 1933  7 Sheets-Sheet 3
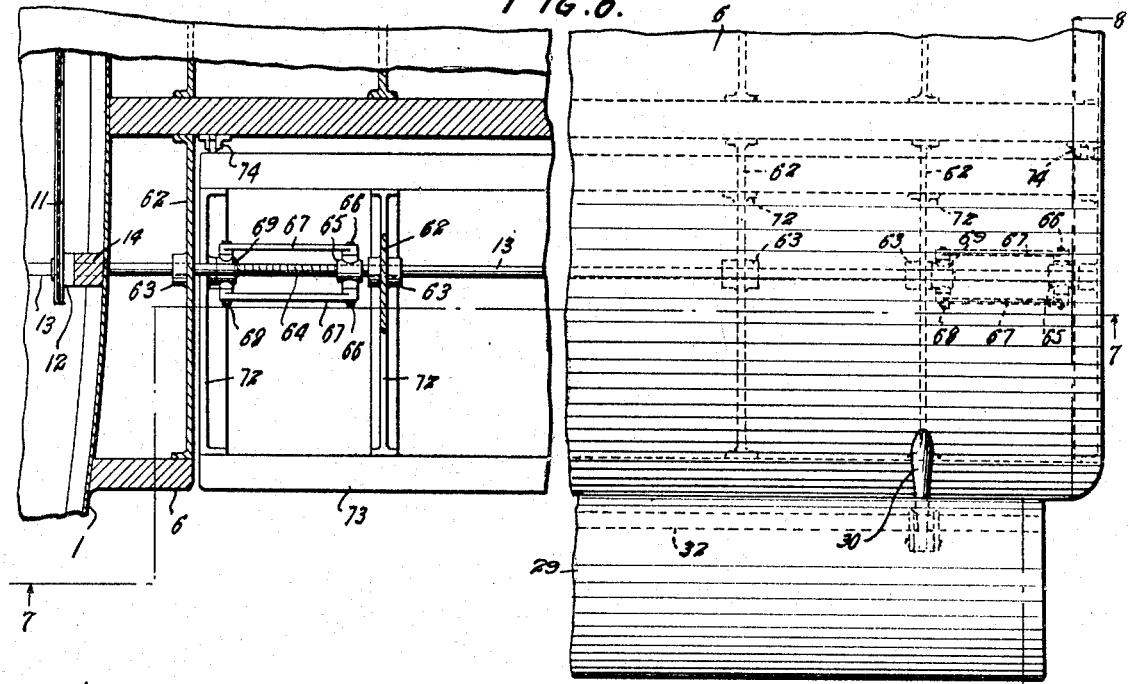
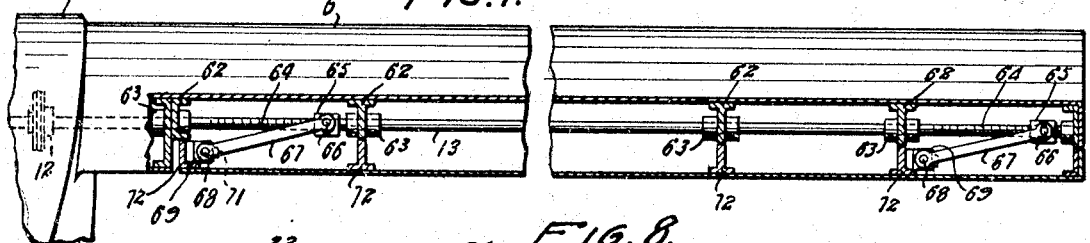
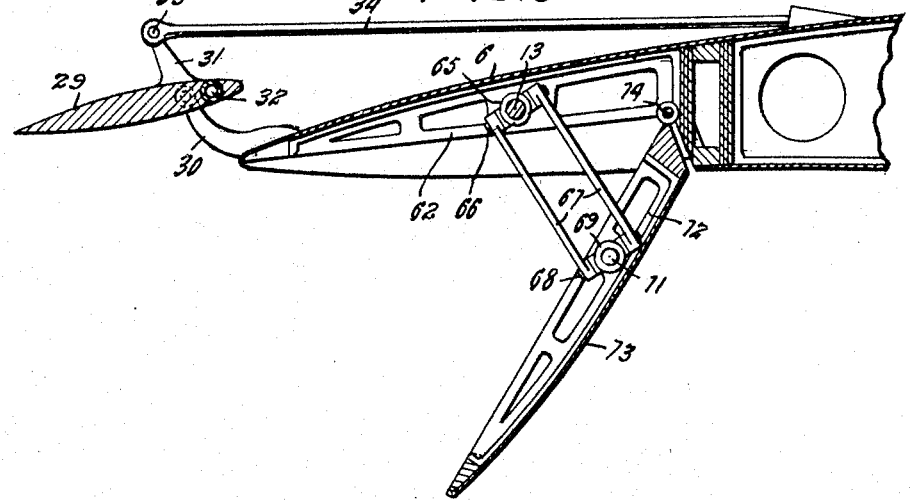
Inventor
EDWARD F. ZAPARKA
By Semmes & Semmes
Attorneys

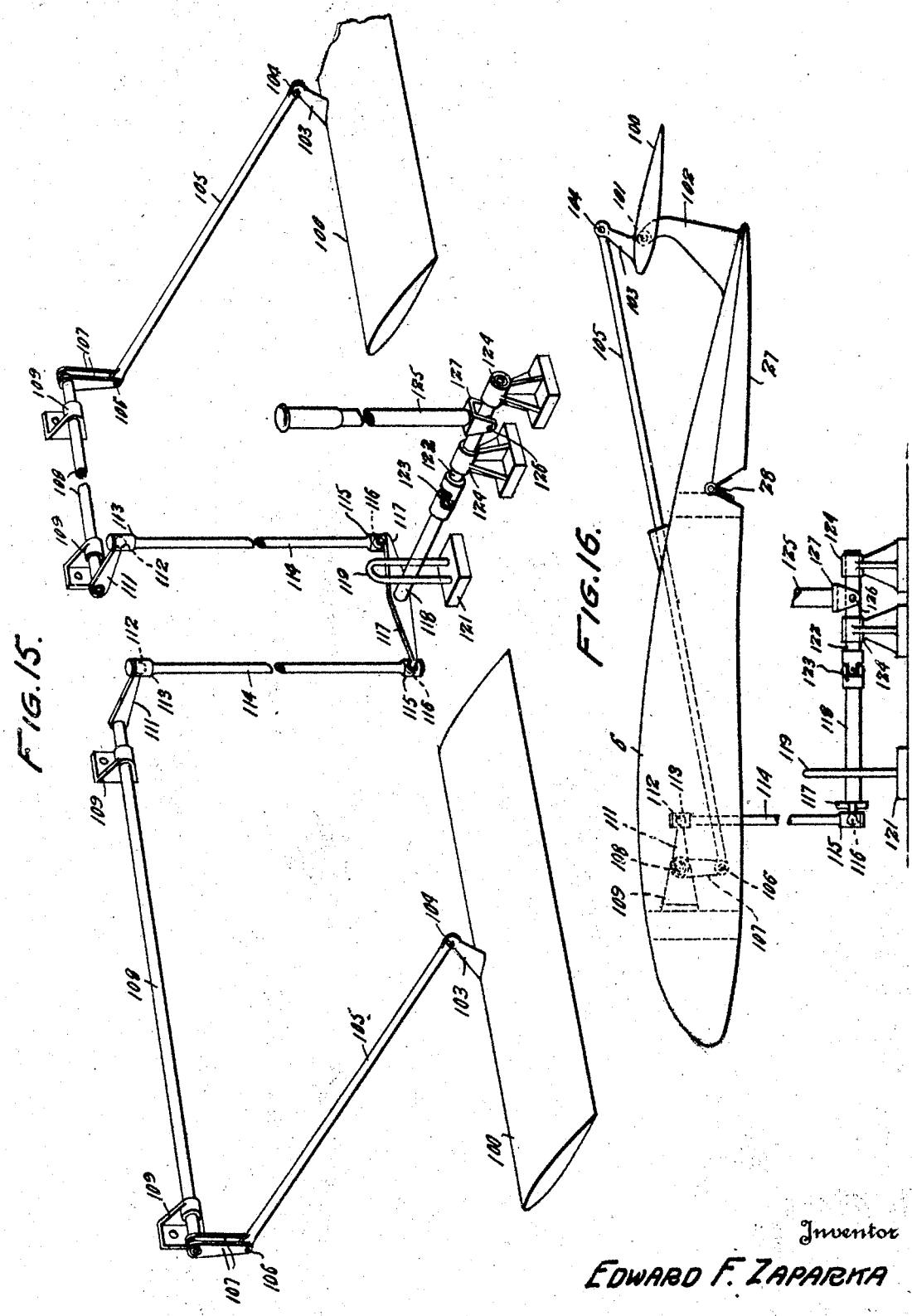

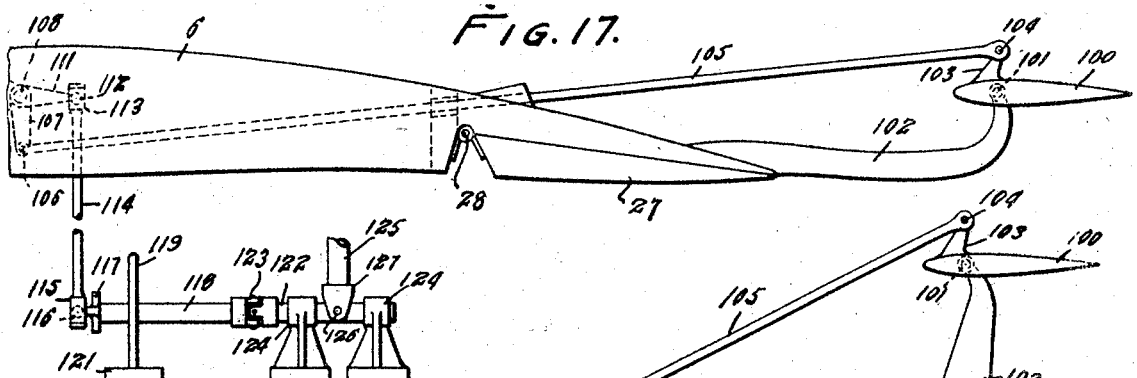
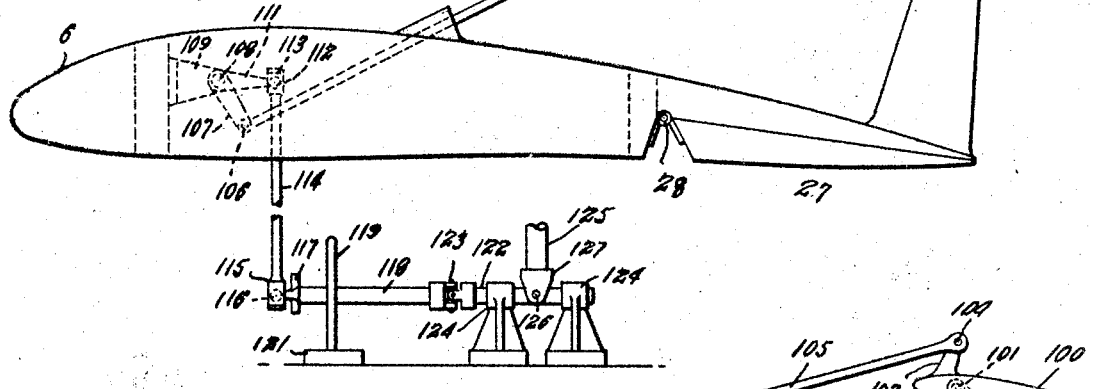
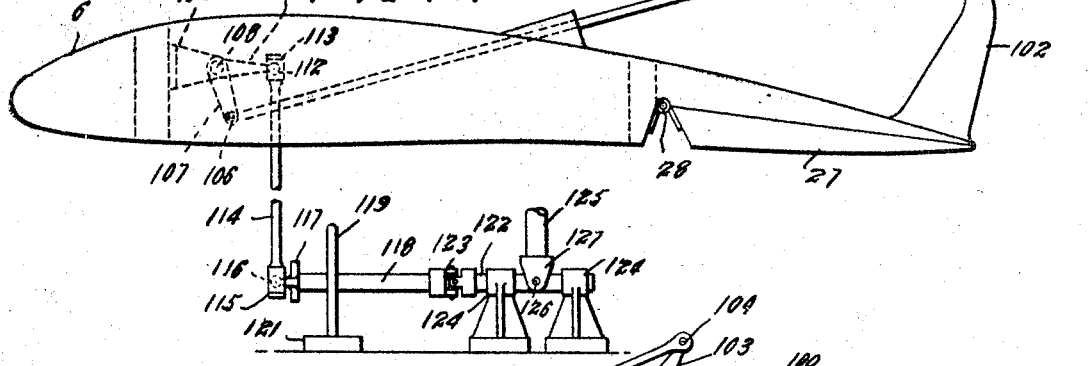
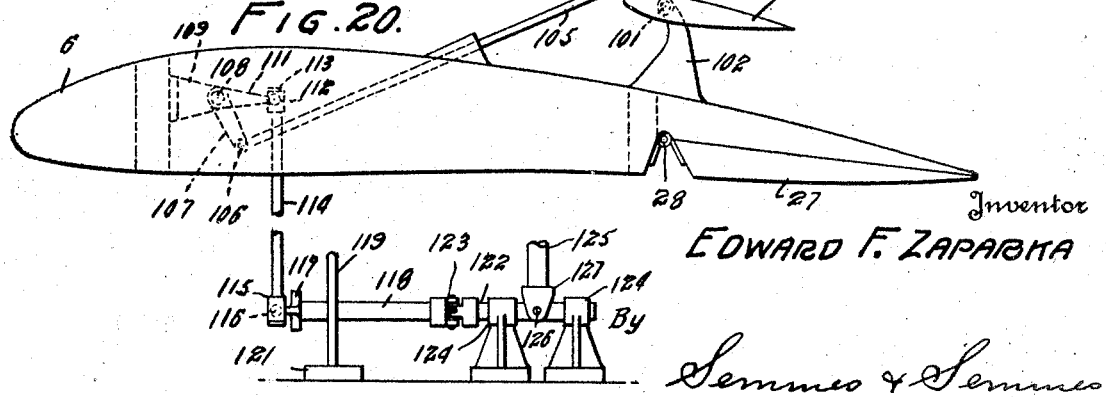

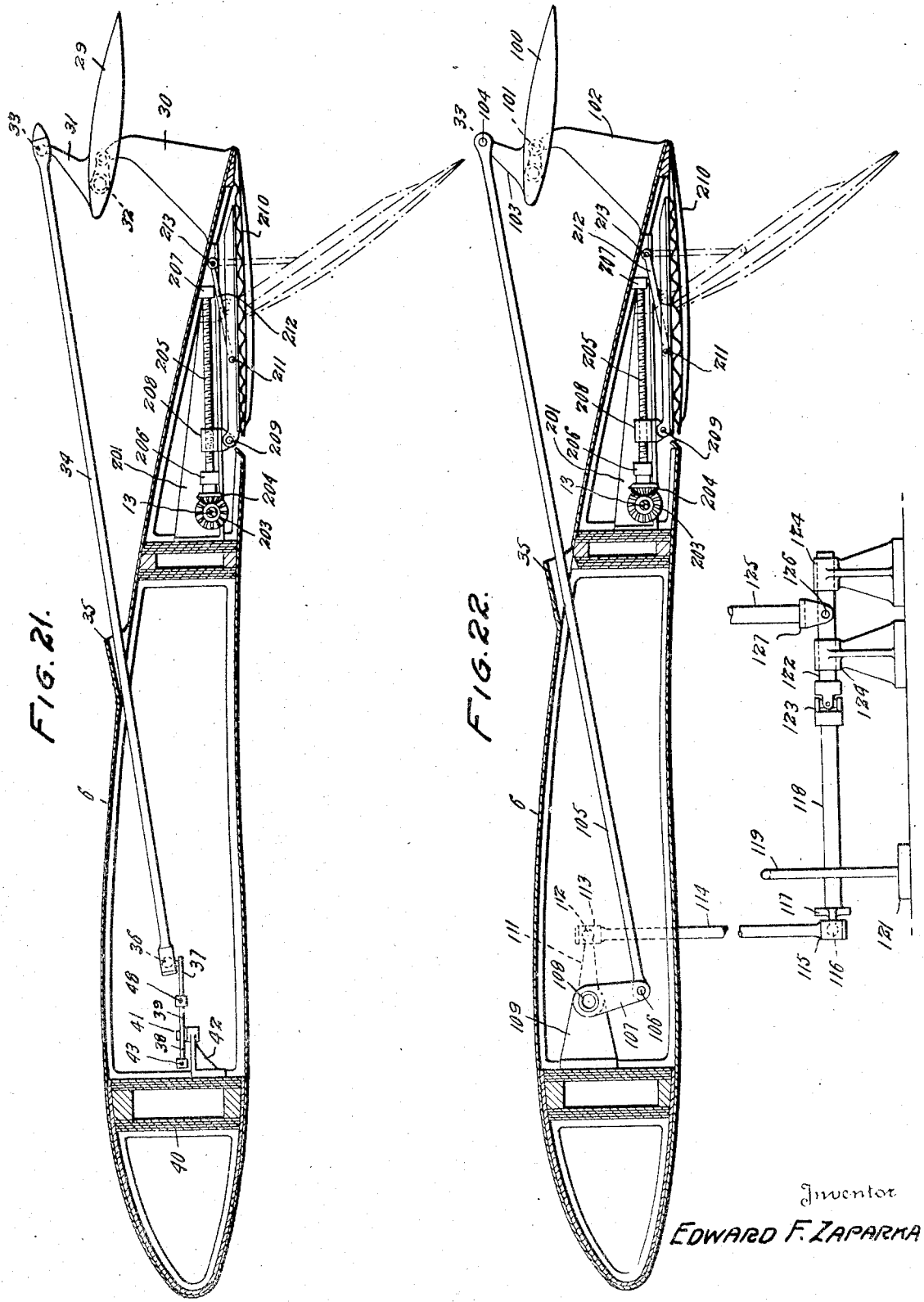

Patented Aug. 28, 1934

1,971,592

UNITED STATES PATENT OFFICE 1,971,592

AILERON AND FLAP CONSTRUCTION

Edward F. Zaparka, Baltimore, Md., assignor to Zap Development Corporation, Baltimore, Md., a corporation of Delaware Application July 21, 1933, Serial No. 681,643

66 Claims. (Cl. 244—29)

My invention relates to airplane constructions, and more particularly to wing structures in combination with constructions for lateral control of the airplane.

This application contains subject matter and claims common to applicant's co-pending application Serial No. 657,134.

An object of my invention is to obtain adequate lateral control and quick response, in combination with increased lift coefficient of the main airfoils of the airplane.

Another object of my invention is to accomplish the above objects with simple and sturdy constructions that are positive in operation, and require small repair or replacement.

With these and other objects in view, which may be incident to my improvements, the invention consists in the parts and combinations to be hereinafter set forth and claimed, with the understanding that the several necessary elements comprising my invention may be varied in construction proportions, and arrangement, without departing from the spirit and scope of the appended claims.

In order to make my invention more clearly understood, I have shown in the accompanying drawings means for carrying the same into practical effect without limiting the improvements in their useful applications to the particular constructions, which, for the purpose of explanation, have been made the subject of illustration.

In the drawings:

Figure 1 is a top plan view of an airplane, part of the wing section being broken away to show the operation of the parts, some of the parts being shown in dotted lines;

Fig. 2 is a sectional view taken on the line 2—2 of Figure 1, looking in the direction of the arrows;

Fig. 3 is a detail view in section showing the wing flap of the form shown in Figures 1 and 2 in its extended position;

Fig. 4 is a view in elevation taken on the line 4—4 of Figure 1, looking in the direction of the arrows, with the flap in the open position, as indicated in Figure 3;

Fig. 5 is a detail sectional view of a modified form of device for operating the flap;

Fig. 6 is a top plan view of a wing with parts broken away showing a modified form of flap operating mechanism;

Fig. 7 is a view taken along the lines 7—7 of Figure 6, looking in the direction of the arrows;

Fig. 8 is a view taken along the line 8—8 of Figure 6, looking in the direction of the arrows;

Fig. 9 is a detail sectional view showing the flap operating mechanism illustrated in Figures 1 to 4, inclusive, with the aileron in a different position from that shown in Figures 1 to 4;

Fig. 10 is a sectional view in detail of the same flap operating construction as shown in Figure 9, with the aileron in still another position;

Fig. 15 is a detail perspective view showing operating mechanism for a floating aileron construction in combination with a wing flap;

Fig. 16 is a detail side elevational view of a wing with a floating aileron construction in combination with a wing flap;

Fig. 17 is a view similar to Figure 16, showing another floating aileron location in combination with a wing flap;

Fig. 18 is a view similar to Figure 16, showing another floating aileron location in a wing flap floating aileron combination;

Fig. 19 is yet another view similar to Figure 16, showing still another combination of wing flap with a floating aileron location;

Fig. 20 is yet another view similar to Figure 16 showing a different floating aileron location in combination with a wing flap;

Fig. 21 is a sectional view taken through a wing showing a combination of aileron with a wing flap which operates within the zone of optimum efficiency;

Fig. 22 is a view similar to Figure 21 in which there is a floating aileron provided in combination with a wing flap operating within the zone of optimum efficiency.

Figure 11:
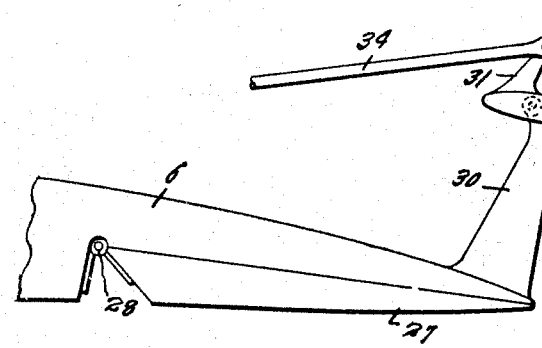
Fig. 11 is a side view, partly diagrammatic, showing the position of an aileron and wing flap in one form of my invention.

Referring to the drawings, I have shown an airplane 1 having a motor 2, a propeller 3 and a fuselage 4. The numeral 5 designates generally the empennage of the airplane, comprising the usual stabilizer, rudder and elevator surfaces. Looking down on the airplane, as shown in Figure 1, the right hand wing is designated as 6 and the left hand wing is designated as 7. The flap and control mechanisms about to be described are the same for both wings.

In the cockpit of the plane I have shown a pilot's seat 8. Within easy reach of the pilot's seat is a handle 9 on a sprocket wheel over which passes a sprocket chain 11 which passes over another sprocket gear located at 12. The sprocket gear located at 12 is adapted to rotate the force transmitting rod 13, which is suitably journaled at points 14 inside the wing construction.

Mounted on the rotating rod 13 are beveled gears 15 which mesh with beveled gears 16 located on drive shafts 17 which are journaled in the rear wing spar. The drive shafts 17 terminate in universal connections 18. Connected to the universal connections 18 are rotating operating rods 19.

Attached to the rotatable operating rods 19 are operating heads 20 which are in screw-threaded engagement with the screw-threaded sections of the operating rods 19 so that upon rotation of the handle 8, which in turn rotates rod 13 through the gear chain just indicated, the operating rods 19 may be caused to rotate to feed the operating heads 20 backward and forward on the operating rods 19. Attached to the perating heads 20 are upper links 21 and lower links 22 which are pivoted to the operating heads 20 at one end. The link 21 is pivoted at its other end, at 23, to part of the bracing structure 24 of the wing. The lower link 22 is pivoted at 25 to the bracing construction 26 of a flap 27.

The flaps 27, on each of wings 6 and 7, are fixedly pivoted at points 28 below the upper surface of the wing, as is plainly indicated in Figures 1, 2 and 3.

Upon movement of the handle 9 through the chain of mechanism indicated, the operating heads 20 travel on the operating rods 19 and through the link action, the flap 27 is either extended, as indicated in Figure 3, or retracted, as indicated in Figure 2. This flap construction permits an increase in the lift coefficient of the airfoils, and this lift coefficient increase is under control of the pilot so that when it becomes necessary, for instance, to make a landing at a slow speed, the flaps 27 can be extended manually by the pilot from his seat 8, and the flying characteristics of the airplane changed.

I have shown ailerons 29, in the construction shown in Figures 1 to 3 inclusive; mounted above the upper surface of the airfoils and at a position such that the leading edge of the aileron is approximately directly above the trailing edge of the wing, that is to say, approximately within the locus of lines drawn perpendicular to the datum lines of the wing section, and passing through the trailing edge of the wing. This location of my aileron I find to be an excellent one, but it is not the only efficient location, as will be apparent from the ensuing description.

The control mechanism of the aileron is somewhat conventional. The ailerons 29 are mounted on horns 30, and are provided on their upper surfaces with arms 31 which project backwardly. The aileron bodies 28 are provided with bracing spars 32.

The backwardly projecting arms 31 have pivoted at 33 aileron control rods 34 which pass through apertures 35 in the upper wing structure. The other ends of the control rods 34 are pivoted at 36, through a ball and socket arrangement, to arms 37 of bell crank levers, each having two other arms 38 and 39, respectively. The bell crank levers are pivoted at 41 to brackets 42 in each wing attached to the front wing spar 40, as is apparent from an inspection of Figure 2. By reason of the linkage as shown in the drawings, the aileron that is moved up passes through a greater angle than the aileron that is moved down, which gives the desirable differential movement of the aileron.

The bell crank levers 38 are attached to cables 43 which pass over pulleys 44 and 45, and thence over a drum 46 located in front of the pilot. The drum 46 is operable by a hand wheel 47, diagrammatically illustrated. The arms 39 of the bell crank levers are attached to cables 48 which are joined together. By rotating the hand wheel 47 the ailerons 29 on either wing can be raised or lowered. If the aileron on the right wing is raised, the aileron on the left wing will be lowered, and vice versa. The rotation of the hand wheel through the cable connections causes force to be exerted on the arms 38 and 39 of the bell crank levers, and the arms 37 move the control rods 34 either forward or to the rear to effect the aileron adjustments.

In Figure 5 I have shown a detailed cross section of a modification in which I have shown a flap member 49 pivoted at 51 to the airfoil bracing members. There is shown a covering 52 which passes over the under surface of the trailing edge of the airfoil proper. The flap 49 in its upper position, as indicated in dotted lines in Figure 5, has its upper surface adjacent this covering 52 on the under side of the trailing edge of the wing. In this instance there are not a plurality of links attached to each operating rod, at each station.

I have shown the pivoted pinions 16 attached directly to operating rods 53 which are journaled in the rear wing spar 50 at one end, and at their opposite end in journal blocks 54 formed in the interior bracing construction 55 of the rear portion of the wing. Operating heads 56 are adapted to screw-threadedly engage the operating rods 53 and to be moved on rotation thereof. To the operating heads are pivotally attached, at 57, links 58. The other ends of the links 58 are pivotally attached at 59 to the flap constructions 49. There is a cut out portion 61 in the flap construction 49, and the links 58 are bent, as indicated in Figure 5, so that in the raised position of the flaps, as indicated in dotted lines in Figure 5, there will be a clearance between the parts. The position of the ailerons 29 in the construction illustrated in Figure 5 is similar to that shown in the form illustrated in Figures 1 to 4, inclusive.

In Figures 6 to 8 inclusive, I have shown a form of construction in which the operating links are pivoted on axes which are substantially at right angles to the axes on which the flaps themselves are pivoted to the wing constructions.

Referring to Figures 6 to 8, the wings are shown with fore and aft bracing members 62 in which are journaled, at 63, the rotatable rod or shaft 13. The shaft 13 is provided at spaced stations in each wing section with screw-threaded portions 64 upon which are adapted to travel operating heads 65. Pivoted at 66 on the operating heads are links 67 which are pivoted at their other ends at 68 to an operating head 69 which is pivoted in turn to a stub shaft 71 carried on the bracing members 72 of a flap construction 73.

The flap construction 73 is pivoted at points 74 to the airfoil. The links 67 are pivoted to the operating heads, and the axis of pivoting is substantially transverse to the axis of pivoting of the flap proper. On rotation of the rod 13, the flap may be opened and closed through the movement of the operating heads 65 along the shaft 13. The aileron construction is similar to that shown in all of the forms heretofore described.

In Figure 9 I have shown an aileron located somewhat further above the wing than in the forms heretofore described. The locus of lines perpendicular to the datum lines of the wing sections passing through the trailing edge of the wing sections passes through substantially the middle of the aileron chord.

In Figure 10 I have shown a form of aileron in which the trailing edge of the aileron lies approximately above the trailing edge of the airfoil. As in the case of the form of aileron shown in Figure 9, the distance of the aileron above the upper surface of the airfoil is greater than that of the forms illustrated in Figures 1 to 8 inclusive.

In any of the forms described the rotation of the hand wheel 47 will cause the ailerons 29 to assume desired positions. When the aileron on the right hand wing is moved into the down position, (with its trailing edge lowered) the aileron on the left hand wing is adapted to be moved in the up position, (with its trailing edge raised) and the movement of the trailing edge of the aileron into the up position will be greater than the movement of the trailing edge of the opposite aileron into the down position.

It will be noted that the ailerons 29 are narrow but long and, therefore, affect the flow of air over a substantial portion of the area of the upper surface of the wings. When an aileron is moved into the down position, at favorable angular settings, it affects the flow around the wing to tend to prevent burbling or turbulence, and tends to hold the flow in contact with the upper surface of the wing. This has a noticeable effect in increasing the lift coefficient of the wing on which the aileron is moved in the down position. By being moved into the down position, I mean that the trailing edge of the aileron is moved down. The lift coefficient, therefore, is increased and we have not only the effect of the aileron itself acting by its airfoil section in the flow to raise that wing when it is moved in its down position, but we have the additional effect of the aileron on the wing itself, tending to increase the efficiency of the wing as a lifting surface. This feature is of extreme importance and gives a sensitivity and positiveness of control which is highly desirable.

The effect is opposite upon the raising of an aileron, that is to say raising the trailing edge of the aileron tends to disturb the flow around the wing, thus tending to lower the lift coefficient of the wing upon which the aileron is raised.

We thus have the ailerons giving both positive and negative lift effect on the wings themselves, which is in addition to the positive and negative lift effect which is achieved through the instrumentality of the ailerons acting by their airfoil sections in the flow.

Because of this unique effect of the aileron by reason of its location and form, efficiency and sensitivity of lateral control is greatly increased over prior practice.

In addition to the effect of the ailerons alone and the effect of the ailerons on the flow around the wing, I have another very important factor which is the modifying effect of the flap itself on the aileron-wing combination. The effect of the flaps when in open position is to change the flow around the wings and since the ailerons also affect the flow around the wings, I have both the flap and aileron combination affecting the performance of the main airfoils. This combination of flap, aileron and wing gives a sensitivity of lateral control which is highly desirable and which is efficient at relatively high angles of attack. The flap when in operative position increases the lateral control, making more operative the aileron-wing combination, particularly at low speeds.

Because of the location of the aileron, the flap may be made to operate on substantially the total length of the wing, thus permitting the change in lift-coefficient produced by the flap to be operative over substantially the entire wing span.

Because the ailerons do not interfere with the flaps, they can be run over substantially the entire wing span if desired.

In Figure 11 I have illustrated a flap-aileron combination in which the aileron has its pivot approximately an aileron chord above the trailing edge of the wing and in line with the perpendicular drawn through the trailing edge of the wing to the datum line of the wing section. This location of the aileron in the aileron-flap combination I have found to be quite efficient.

Figure 12:
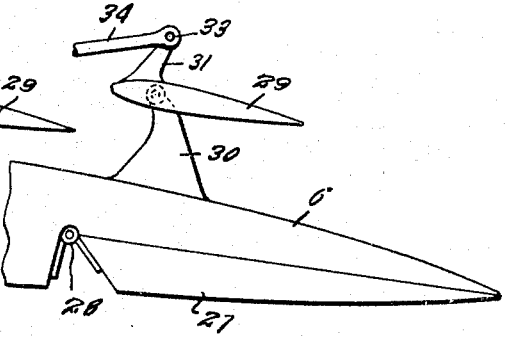
Fig. 12 is a side elevation, partly diagrammatic, showing another aileron and wing combination.

In Figure 12 I have shown a flap and aileron combination in which the aileron has its leading edge approximately two aileron chords in front of the trailing edge of the wing and its pivot substantially one-half an aileron chord from the upper wing surface.

Figure 13:
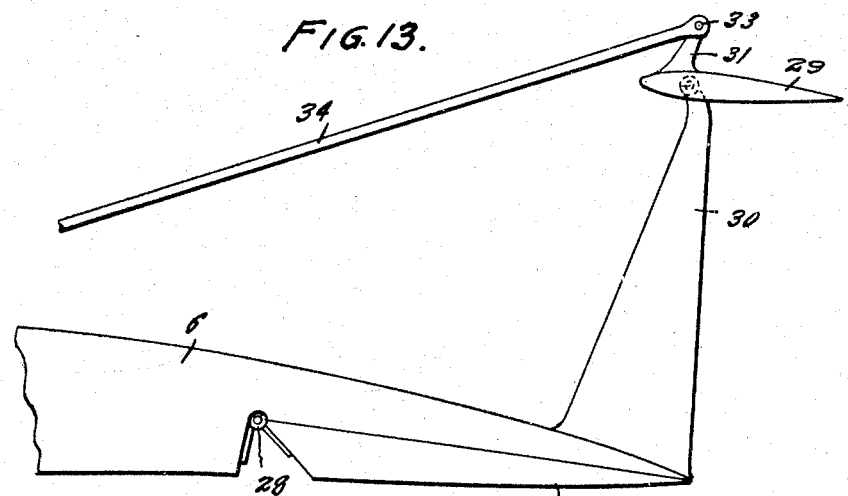
Fig. 13 is another side elevation, partly diagrammatic, showing a further wing flap and aileron combination.

Again in Figure 13 I have shown an aileron-flap combination in which the aileron has its pivot substantially in the perpendicular to the datum line of the wing section, which passes through the trailing edge of the wing, and at a distance of approximately two aileron chords from the trailing edge of the wing.

Figure 14:
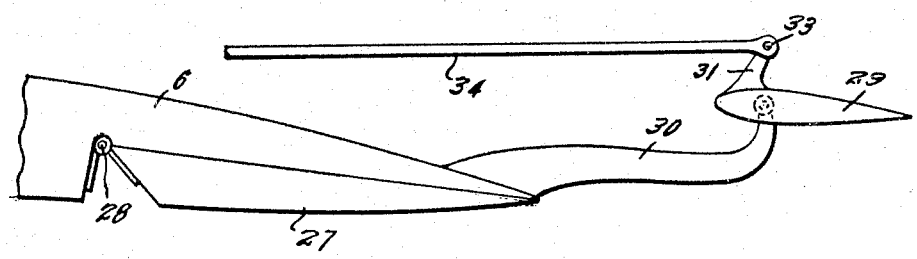
Fig. 14 is a diagrammatic illustration in side elevation of a different wing flap and aileron combination.

In Figure 14 there is diagrammatically illustrated a combination aileron and wing flap in which the aileron has its pivot substantially one-half an aileron chord above the trailing edge of the wing and its nose about one aileron choird in the rear of the trailing edge of the wing.

The forms of aileron location in this flap-aileron combination which I have illustrated are merely examples of constructions which I may employ. Preferably I locate the aileron from one-third of a chord to two aileron chords above the trailing edge of the wing, and in such positions that the nose of the aileron shall be from two aileron chords in front of the trailing edge to one aileron chord in rear of the trailing edge of the wing. Another way of stating it is that the trailing edge of the aileron shall be approximately one chord in front of the trailing edge of the wing or two chords to the rear of the trailing edge of the wing. I do not desire to be limited within the exact limits as indicated. In some forms of construction the limits I propose may be used, or in some cases even increased, and in other forms of plane construction it is not desirable to have the aileron assume the positions indicated by the limits mentioned. In general it is desirable to so locate the ailerons above the wings as to increase the flow of the combination of aileron and wing on the side to be raised and to decrease the velocity of air flow over the upper surface of the opposite side. This produces a desirable rotation about the fore and aft axis of the plane, which is the product of the action of the ailerons themselves and of the effect of the air flow over the surfaces of the wings as modified by the aileron action.

While I have shown various positions of my aileron construction in the drawings and given some definite limits for efficiency of operation with respect to the position of the ailerons, I wish it to be distinctly understood that I am not limited in my broadest concept to the particular showings made. I believe myself to be the first to discover and put to practical application the use of ailerons which are distinct and separate from the major airfoil sections and which are not a part of the major airfoil section in any sense, and which affect the flow around a material portion of the major airfoil section in addition to the reaction on the aileron itself due to its own airfoil section being changed through certain angular limits. Therefore, I do not wish to be limited to the particular showings made.

My researches have shown that other positions of ailerons than those indicated by the limits stated in this application possess to a certain degree the efficiency characteristics of the defined aileron. It is to be distinctly borne in mind that, basically, I believe myself to be the first to discover that an aileron which is in no sense a part of the major airfoil can be used to affect the flow around the major airfoil both positively and negatively to cause a sufficient change of the flow over a sufficient area of the main airfoil to produce a practical and usable rolling moment which is in addition to the rolling moments produced by the airfoil sections of the ailerons per se.

Therefore, the apparent indecision on aileron location is not one in effect and the phraseology of the above location definition is caused by the manner of stating the location point by multiples of aileron chord. There is, however, an interrelation existing as to favorable aileron location as to wing chord and aileron chord dimensions, and the location definitions given here are also taking care of that phenomenon. While I also term the location as specified by description of Figures 1 to 3 as a favorable one, the other locations are giving satisfactory results. The research which I have done is not limited to the positions of aileron illustrated, and other aileron positions around the main airfoil, such as in the vicinity of the forward part of the main airfoil, have proven advantageous and to possess the inherent operative features which I have here disclosed.

In order to explain what I mean by the term "downflow", as used in the claims, it must be remarked that the region of flow above a wing can be divided into two parts, namely, the upflow and the downflow, relative to the flight path of the airplane. The term "downflow" used in the claims refers to that region above the surface of the airfoil in which the airflow is deflected downward from its original relative direction parallel to the line of flight of the aircraft or wing.

It is the location of the ailerons substantially within the downflow over a wing which is of great importance in achieving the desirable reactions which I have described. In some instances the aileron may be located well forward of the forward position defined in aileron chords which I have just set forth, but so long as the aileron lies substantially within the downflow, the desirable results are obtained.

The term "downflow" as used in the claims also is intended to cover that flow of air which occurs back of and adjacent to the trailing edge of the wing. The word "downflow" therefore is intended to cover the flow of air around an aileron located above the wing but substantially rear of the trailing edge. Such airflow back of the trailing edge of the wing is often called "downwash", but the word "downflow" as I here employ it covers this downwash area as well as the flow of air adjacent to and over the upper rear surface of the wing.

To sum up, the wing flap modifies the flow around the wing, the aileron modifies the flow around the wing as well, and the combination produces desirable rotative moments about the longitudinal axis of the airplane which are in addition to the rotative moments of the airfoil sections of the ailerons themselves. It is to be understood that any of the forms of operating flap mechanisms may be employed with any of the aileron positions shown or described, the showing of the various aileron positions in the figures being merely illustrative and diagrammatic.

The flaps in operative position stimulate the flow past the ailerons, thus increasing the efficiency of the ailerons, which is of particular advantage at a time when the air speed of the plane is low, and particularly when substantially below that of a conventional airplane not using flaps, where other types of ailerons lose a substantial part of their effectiveness.

Referring to the drawings, Figures 15 to 20 inclusive, I have shown a floating aileron mechanism in combination with wing flaps. The floating aileron mechanism is probably best shown in the perspective view, Figure 15. The location of these floating ailerons in my invention is the same as for the ordinary ailerons. There are certain inherent advantages in floating ailerons which are additional to the advantages of my ordinary aileron construction. The type of floating aileron construction I have shown is one in which the ailerons float together. I have found that this type of floating aileron construction in the location which I employ is somewhat preferable to a floating aileron construction in which each of the ailerons may float separately. Where the ailerons float together there is more inherent stability in the combination than is the case where each aileron may separately float.

The floating ailerons I have designated by the numerals 100. These ailerons are pivoted at 101 on aileron horns 102 located on the upper surface of the wings 6. The ailerons are provided with horns 103 to which are pivoted at 104 aileron operating rods 105.

The aileron operating rods 105 are pivoted at 106 to crank arms 107 which are attached to shafts 108. The shafts 108 are suitably journaled on supports 109 attached to the front wing spars. The ends of the shafts 108 opposite the cranks 107 are provided with cranks 111 which carry ball members 112. The ball members 112 engage with socket members formed in enlarged portions 113 of rods 114.

The rods 114 at their lower ends carry socket members at 115 in which are adapted to pivot ball members 116 which are carried on operating arms 117. Thus ball and socket joints are formed at either end of the rods 114. The arms 117 may be integrally formed and are attached to a shaft 118. An elongated link-shaped guide member 119 which is supported, as indicated at 121, at some suitable place in the fuselage, permits certain side play to the shaft 118 and a large up and down movement of the shaft 118. The side play, however, is not great.

The shaft 118 is coupled to a shaft 122 through a gimbal joint connection 123 which allows motion in all planes. The shaft 122 is journaled in supports 124 which are supported at some convenient place near the floor of the fuselage.

The control stick 125 is pivoted at 126 to the shaft 122. The control stick 125 is provided at its lower end with a U-shaped support member 127 through which the pivot 126 passes. The pivot 126 passes through an aperture in the shaft 122. The U-shaped support 127 permits forward and backward movement of the control stick 125 by the pilot without affecting the ailerons.

Upon lateral motion of the control stick 125 the shaft 122 is caused to rotate and such rotation is transmitted through the gimbal joint 123 to the shaft 118. The shaft 118 rocks and causes arms 117 to move and this movement is transmitted through ball and socket joints to rods 114 and then through ball and socket joints to crank arms 111. The motion of the crank arms 111 causes the shafts 108 to rotate in opposite directions to raise or lower the ailerons 100 to give the desired rolling moments.

It will be apparent from an inspection of the linkages and force transmitting members that the ailerons 100 may seek a position of balance with the forces of the airstream passing over them, when not under active control of the pilot through lateral motion of the control stick 125. let us assume that the plane is flying in such a position that the forces of the airstream tend to raise the trailing edges of the ailerons 100. This will create compression forces in the rods 105 which will cause such rotation of the shafts 108 as to move the rods 114 downwardly. Because of the ball an socket connections of the rods 114 to the cranks 111 and to the arms 117, the effect of the upward motion of the trailing edges of the ailerons 100 is to lower the arms 117 carrying with them the shaft 118. The motions of the parts freely permit this and the downward movement of the shaft 118, because of the gimbal joint connection at 113 does not in any way interfere with the immovability of the shaft 122 nor cause any binding of any of the parts.

On the contrary, upon motion of the control stick 125 in a lateral direction, the ailerons may be differentially operated to give desirable rolling moments.

A similar phenomenon occurs when the forces of the airstream passing over the ailerons tend to lower the trailing edge of the ailerons, but in such case the arms 117 are raised, raising with them the end of shaft 118. The link-shaped guide 119 in either direction of movement of the shaft 118 tends to prevent undue lateral movement of the shaft 118 but permits the verical movement; all without undue binding or friction.

Because the ailerons can float, they can assume such positions that they align themselves with the airstream which flows around them. This is of marked utility at high angles of attack of the wing when the ailerons otherwise might be in such position as to cause them to be delayed in producing the desired effect. When the ailerons, however, as in the case of this floating aileron construction, can assume a position of balance with the airstream around them, they are in a position to efficiently operate in response to the pilot's control.

In Figure 16 I have shown a flap in combination with a floating aileron construction in which the aileron is pivoted approximately two-thirds of an aileron chord above the upper surface of the wing, and has its nose approximately one-third of an aileron chord in front of the trailing edge of the wing.

In Figure 17 the flap floating aileron combination shows the aileron having its trailing edge approximately two aileron chords in the rear of the trailing edge of the wing and having its pivot point approximately half an aileron chord above the upper wing surface.

The form illustrated in Figure 18 shows the aileron pivoted approximately two aileron chords above the upper surface of the wing and having its trailing edge approximately one-half an aileron chord in the rear of the trailing edge of the wing.

Figure 19 shows a floating aileron flap combination in which the aileron is pivoted approximately one aileron chord above the upper wing surface and has its trailing edge approximately two-thirds of an aileron chord to the rear of the trailing edge of the wing.

In Figure 20 I have shown an arrangement of aileron and flap in which the aileron has its trailing edge approximately one aileron chord in front of the trailing edge of the wing and its pivot point approximately one-half an aileron chord above the upper wing surface.

The locations of the floating aileron are supposed to be similar to the locations of the common type of aileron shown and described in connection with Figures 1 to 14 inclusive, and what has been said concerning the location of the ailerons shown in Figures 1 to 14 inclusive with respect to their location being substantially within the downflow is applicable here. The advantages of location, preferable limits of position and other factors are substantially the same for both types of aileron. There are, of course, inherent advantages in the floating aileron constructions which have already been set forth which are present in the forms described in connection with Figures 15 to 20 inclusive, which are not present in the forms shown in Figures 1 to 14 inclusive.

As before stated, the floating aileron construction permits the ailerons to seek a position of equilibrium with the forces of the airstream passing over their surfaces, which present certain inherent advantages in acute angles of attack. These advantages are additional to the advantages of aileron locations which have previously been set forth in some detail. At high angles of attack ordinary ailerons may be delayed in their action, but this does not apply to as great an extent with floating ailerons. The construction which I have described in which the ailerons float together I have found to be peculiary efficient.

Now referring to Figure 21, I have shown my combination of aileron and flap in which the flap employed is of the "Zap" type, i. e., one which operates in the zone of optimum efficiency.

In Figure 21 the shaft 13 carries at the various stations along each wing beveled gears 203 which mesh with beveled gears 204. The beveled gears 204 are mounted on screw-threaded operating rods 205 which are journaled on supports 206 at their forward ends and on supports 207 at their rearward ends. The supports 207 may be in turn supported on bracing rods 201, or otherwise suitably supported. Adapted to travel on the screw-threaded operating rods 205 are operating heads 208 to which are pivoted at 209 the wing flaps 210, which are adapted in the up position to lie substantially flush with the lower surface of the wing, as shown in Figure 21. The flaps 210 are pivoted at 211 to links 212 whose other ends are pivoted at 213 to supporting structure in the wing, which in the present case may be the bracing ribs 201, or any other suitable member.

The point of pivoting of the flap to the operating head 208, the point of pivoting of the flap to the link 212, the length of the link and the point of pivoting of the other end of the link are such as to insure that the trailing edge of the flap in all extended positions shall lie substantially adjacent to the locus of perpendiculars drawn to the datum lines of the wing sections and passing through the trailing edges of the wings.

I have found that this position of the flap in which its trailing edge lies within the defined locus is a position of optimum efficiency. Another way of stating this is to say that in extended positions the trailing edge of the flap lies substantially directly below the trailing edge of the wing. With such a position for the trailing edge of the flap in its extended positions, there is a great increase in lift coefficient of the wings and at the same time but small shift in the aerodynamic longitudinal metacenter of the normal airplane for the various positions of the flap while it is being extended or retracted. All of this makes for a construction economy, saves weight, and causes the airplane to have safe flying characteristics. In my copending application Serial No. 657,133, I have more fully set forth the advantages and reasons behind the advantages in connection with the type of flap shown.

In general it may be stated that the type of flap shown which operates in the zone of optimum efficiency stimulates the flow over the upper surface of the wings to a great extent, yet does not seriously disturb the center of pressure of the airplane, and the combination of these wing flaps with the ailerons shown gives an operative combination possessing great advantages.

The combination permits the airplane to fly at speeds much slower than the normal without danger of serious disturbance of the operative characteristics of the airplane, while insuring stable and sensitive lateral control. This lateral control is powerful even at flying speeds well below the normal, and also at high angles of attack. The wings flaps stimulate the flow over the upper surface of the wings to the advantage of the ailerons in their operation on the flow over the upper surface of the wings.

In the drawings, Figures 21 and 22, the flap is of the type which operates within the zone of optimum efficiency, i. e., one whose trailing edge in extended positions lies substantially in the locus of lines drawn perpendicular to the datum lines of the wing sections, which pass through the trailing edge of the wing. Of course constructional difficulties do not ordinarily permit the trailing edge of the wing flaps to lie exactly within the defined zone, and there is some variance from the optimum position at certain points in the operation of extending and retracting the flaps. These variations are different for varying constructions, and I do not wish to be further limited in the interpretation of the claims than is imposed by the showing of the prior art and the doctrine of equivalents.

This combination of the "Zap" type of flap with the aileron operating within the downflow gives a very efficient combination. This combination gives excellent results since there is small disturbance to the aerodynamic longitudinal metacenter of the airplane upon operation of the flap, and the downflow over the aileron is greatly stimulated and the lift of the airfoil is greatly increased thereby. All of these factors are separately desirable and mutually cooperate to produce mutual advantages.

In Figure 22 I have shown a combination of the "Zap" flap arrangement which operates within the zone of optimum efficiency together with ailerons located in the downflow. These ailerons are of the floating type and possess the inherent advantages of such ailerons. The ailerons in this construction are adapted to float together. The mechanism permitting them to float is the same as that previously described.

While I have shown and described the preferred embodiments of my invention, I wish it to be understood that I do not confine myself to the precise details of construction herein set forth by way of illustration, as it is apparent that many changes and variations may be made therein by those skilled in the art, without departing from the spirit of the invention, or exceeding the scope of the appended claims.

I claim:

1. An airplane construction comprising a wing or airfoil having a downflow over its upper surface, an aileron so positioned above and with respect thereto as to affect the lift of the airfoil over a substantial portion of its surface located substantially in the downflow, and a flap pivoted at the rear of the airfoil and on its under surface to swing about a fixed axis to vary the downflow over the wing in the region under at least a portion of the aileron.

2. An airplane construction comprising a wing or airfoil having a downflow over its upper surface, an aileron having a substantial portion of its surface in the downflow over the airfoil so positioned above and with respect thereto as to affect the lift of the airfoil over a substantial portion of its surface, a flap fixedly pivoted to the under surface of the airfoil to vary the downflow over at least a portion of the aileron, a rotatable operating rod, links pivoted to the flap and to the body of the airfoil, and means carried by the operating rod to open and close the flap.

3. An airplane construction comprising a wing or airfoil, having a downflow over its upper surface, an aileron located substantially in the downflow and so positioned above and with respect thereto as to affect the lift of the airfoil over a substantial portion of its surface, an operating rod journaled to rotate within the airfoil, a flap fixedly pivoted to the under side of the airfoil in the vicinity of the rear edge thereof, and link mechanism operated by the rotating operating rod to open and close the flap.

4. An airplane construction comprising a wing or airfoil having a downflow over its upper surface, an aileron so positioned above and with respect thereto as to affect the lift of the airfoil over a substantial portion of its surface, a substantial portion of the aileron being in the downflow over the airfoil, a flap fixedly pivoted at the under surface of the airfoil to vary the downflow over at least a portion of the aileron, and link mechanism movable in a plane at an angle to the longitudinal axis of the fuselage to open and close the flap.

5. In an aircraft, an airfoil having a downflow over its upper surface and having a trailing edge, an aileron carried by said aircraft and positioned spaced above and substantially rearwardly of the trailing edge of said airfoil, a substantial portion of the aileron being in the downflow over the airfoil, and a flap pivoted at the rear of the airfoil and on its under surface to swing about open and close the flap, and an aileron carried by the airfoil and positioned spaced above and substantially rearwardly of the trailing edge of the airfoil, said flap varying the downflow over at least a part of the aileron.

17. A device of the character described comprising an airfoil having a downflow over its upper surface, a flap member fixedly pivoted to the lower rear surface thereof, a rotatable operating rod supported by the airfoil, an operating head engaging screw-threads on the operating rod, and movable by rotation thereof, a link pivoted at its lower end to the flap and at its other end to the operating head to open and close the flap on rotation of the operating rod, a drive shaft connected to the operating rod to rotate the same, and an aileron so positioned above and with respect to the airfoil as to affect the lift of the airfoil over a substantial portion of its surface and having a substantial portion of its surface in the downflow over the airfoil and directly affecting the change in downflow induced by the flap.

18. In an aircraft, an airfoil having a downflow over its upper surface and having a trailing edge, an aileron carried by said aircraft and positioned spaced above and substantially rearwardly of the trailing edge of said airfoil and in the downflow over the airfoil, a flap member fixedly pivoted at the lower rear surface of the airfoil to vary the downflow over at least a portion of the aileron, a rotatable operating rod supported by the airfoil, an operating head engaging screw threads on said operating rod and movable by rotation thereof, a link pivoted to the operating head at one end, and at the other to the flap, and a drive shaft to rotate the operating rod.

19. In an aircraft, an airfoil having a downflow over its upper surface and having a trailing edge, an aileron carried by said aircraft and positioned spaced above and substantially rearwardly of the trailing edge of said airfoil and in the downflow over the airfoil, a flap fixedly pivoted to the airfoil at its under rear surface to vary the downflow over at least a portion of the aileron, a link fixed to a fixed pivot on the flap, a movable pivot for the other end of the link carried by the airfoil, and means to move the movable link in a direction substantially parallel to the axis of the pivoting of the flap to open and close the flap.

20. A device of the character described comprising an airfoil having a downflow over its upper surface, an aileron so positioned above and with respect thereto as to affect the lift of the airfoil over a substantial portion of its surface and located substantially in the downflow, a flap member pivoted on the under side of the airfoil to vary the downflow over at least a portion of the aileron, a link fixed to a fixed pivot on the flap, a movable pivot for the link supported by the airfoil, a rotating operating rod, means operating through rotation thereof to move the movable pivot in a direction substantially parallel to the axis of pivoting of the flap.

21. In an airplane construction the combination of an airplane wing having a downflow over its upper surface, an auxiliary airfoil located above the same and located substantially in the downflow and rotatable about an axis transverse with respect to the longitudinal axis of the airplane, and a flap attached to the lower surface of the wing movable into lowered position to vary the flow around the wing to vary the downflow over at least a portion of the auxiliary airfoil.

22. In an airplane construction, the combination of an airplane wing having a downflow over its upper surface, an auxiliary airfoil located above the same and rotatable about an axis transverse with respect to the longitudinal axis of the airplane and located substantially in the downflow, a flap attached to the lower surface of the wing to vary the downflow over at least a portion of the auxiliary airfoil, and a hinged pivot for the flap located in the forward edge of said flap and adjacent the lower surface of the wing.

23. In an airplane construction, the combination of an airplane wing having a downflow over its upper surface, an auxiliary airfoil located above the same and having a substantial portion of its surface in the downflow over the wing and rotatable about an axis transverse with respect to the longitudinal axis of the airplane, a flap attached to the lower surface of the wing to vary the downflow over the wing in the region under at least a portion of the auxiliary airfoil, and a hinged pivot for the flap located in the forward edge of said flap and within the wing.

24. An airplane construction comprising wings having a downflow over their upper surfaces, separate detached ailerons so related to the wings as to affect the downflow over a sufficient area of the wings that there is produced a usable and practical rolling moment in addition to the rolling moment produced by the airfoil sections of the ailerons, and flaps movable into positions to affect the flow around the wings and over the ailerons.

25. An airplane construction comprising an airfoil having a downflow over its upper surface, an aileron so positioned above and with respect thereto as to affect the flow around the airfoil to give both positive and negative effect on said airfoil, depending upon angular movement of the aileron, which effect is in addition to that of the airfoil section of the aileron itself and increases the rolling moment produced by the aileron, and a flap located in the vicinity of the lower rear surface of the airfoil to affect the flow around the airfoil and over at least a portion of the aileron.

26. An airplane construction comprising wings having downflow over their upper surface, an aileron so positioned above and with respect thereto as to affect the lift of each wing over a substantial portion of its surface and having a substantial portion of its surface in the downflow over the wings, said ailerons being located above the wings and in the vicinity of the rear of the wings, and wing flaps movable into operative position to affect the flow around the wings to vary the downflow over at least a portion of the aileron.

27. An airplane construction comprising wings having downflow over their upper surfaces, an aileron so positioned above and with respect thereto as to affect the lift of each wing over a substantial portion of its surface, each aileron having its leading edge from approximately two aileron chords in front of the trailing edge of a wing to one aileron chord behind the trailing edge of the wing, and having its pivot located above the upper wing surface a distance of approximately one-third of an aileron chord to two aileron chords, and means located in the vicinity of the rear lower surface of the wings to affect the flow around the wings and over each aileron.

28. An airplane construction comprising wings having downflow over their upper surfaces, ailerons so positioned above and with respect thereto a fixed axis to vary the downflow over at least a portion of the aileron.

6. In an aircraft, an airfoil having a downflow over its upper surface and having a trailing edge, an aileron carried by said aircraft and positioned spaced above and substantially rearwardly of the trailing edge of said airfoil, a flap fixedly pivoted to the under surface of the airfoil to vary the downflow over the airfoil in the region under at least a portion of the aileron, a rotatable operating rod, links pivoted to the flap and to the body of the airfoil, and means carried by the operating rod, and operating through the links to open and close the flap.

7. In an aircraft, an airfoil having a downflow over its upper surface and having a trailing edge, an aileron carried by said aircraft and positioned spaced above and substantially rearwardly of the trailing edge of said airfoil, an operating rod journaled to rotate within the airfoil, a flap fixedly pivoted to the under side of the airfoil and in the vicinity of the trailing edge thereof, and link mechanism operated by the rotating operating rod to open and close the flap, said flap varying the downflow over a part of the aileron.

8. In an aircraft, an airfoil having a downflow over its upper surface and having a trailing edge, an aileron carried by said aircraft and positioned spaced above and substantially rearwardly of the trailing edge of said airfoil, a flap fixedly pivoted to the under surface of the airfoil to vary the downflow over at least a portion of the aileron, and link mechanism movable in a plane at an angle to the longitudinal axis of the fuselage to open and close the flap, said flap varying the downflow over a part of the aileron.

9. A device of the character described comprising an airfoil having a downflow over its upper surface, an aileron so positioned above and with respect thereto as to affect the lift of the airfoil over a substantial portion of the surface, a substantial portion of the aileron being in the downflow over the airfoil, a flap hinged to a fixed pivot on the airfoil to vary the downflow over the airfoil in the region under at least a portion of the aileron, a rotatable operating rod, a universal connection for rotating the rod, an operating head engaging screw threads on said operating rod and movable by rotation thereof, means moved by said head to open and close the flaps, and a drive shaft connected to the universal connection.

10. A device of the character described comprising an airfoil having a downflow over its upper surface, a fixedly pivoted flap on the under rearward part of the airfoil, a rotatable operating rod, a universal connection for rotating the operating rod, an operating head engaging screw threads on said operating rod movable by rotation thereof, links hinged at one end to the flap and airfoil respectively, and at their other ends hinged to the operating head to open and close the flap, a drive shaft connected to the universal connection, and an aileron so positioned above the airfoil and with respect thereto as to affect the lift of the airfoil over a substantial portion of its surface and having a substantial portion of its surface in the downflow over the airfoil.

11. A device of the character described comprising an airfoil having a downflow over its upper surface, an aileron located substantially in the downflow and so positioned above and with respect thereto as to affect the lift of the airfoil over a substantial portion of its surface, a flap fixedly pivoted to and under the airfoil to vary the downflow over at least a portion of the aileron, a rotatable drive shaft, a universal flexible connection operated by the drive shaft, and means on the flap operated through the rotation of the flexible connection to open and close the flap.

12. An airplane construction comprising an airfoil having a downflow over its upper surface, an aileron so positioned above and with respect thereto as to affect the lift of the airfoil over a substantial portion of its surface, the aileron being in the downflow, a flap fixedly pivoted to the airfoil at its under surface to vary the downflow over the airfoil in the region under at least a portion of the aileron, a rotatable operating rod, a universal connection for rotating the operating rod, members operating through said rotation thereof to open and close the flap, and a drive shaft connected to the universal connection.

13. A device of the character described comprising an airfoil having a downflow over its upper surface, a flap fixedly pivoted to the under rear surface of the airfoil, a rotatable operating rod, a universal connection for rotating the operating rod, an operating head engaging screw threads on said operating rod, and movable by rotation thereof, links hinged at one end to the operating head and at their other ends to the airfoil and the flap respectively, a drive shaft connected to the universal connection, and an aileron so positioned above and with respect to the airfoil as to affect its lift over a substantial portion of its surface and located substantially in the downflow, said flap varying the downflow over at least a part of the aileron.

14. A device of the character described comprising an airfoil having a downflow over its upper surface, an aileron so positioned above and with respect thereto as to affect the lift of the airfoil over a substantial portion of its surface and located substantially in the downflow, a rotatable operating rod supported by the airfoil, and supported for rotation about a fixed axis thereon, an operating head engaging screw threads on said operating rod and movable by rotation thereof, a flap member fixedly pivoted on the lower side of the airfoil to vary the downflow over the airfoil in the region under at least a portion of the aileron, and means engaging said head to open and close the flap.

15. A device of the character described comprising an airfoil having a downflow over its upper surface, a flap member fixedly pivoted to the lower rear side thereof, a rotatable operating rod supported by the airfoil for rotation on an axis fixed with respect to the airfoil, means to rotate the operating rod, an operating head engaging screw-threads on said operating rod, and movable by rotation thereof, a link engaging said head to open and close the flap, and an aileron so positioned above and with respect to the airfoil as to affect the lift of the airfoil over a substantial portion of its surface and located substantially in the downflow, said flap varying the downflow over at least a part of the aileron.

16. A device of the character described comprising an airfoil having a downflow over its upper surface, a flap member fixedly pivoted to the lower side thereof, in the vicinity of the trailing edge, a rotatable operating rod supported by the airfoil for rotation on an axis fixed with respect to the airfoil, means to rotate the operating rod, an operating head engaging screw-threads on said operating rod, and movable by rotation thereof, means engaging said head to as to increase the downflow of the combination of one wing and its aileron on the side to be raised, and to decrease the velocity of the airflow over the opposite side, thereby producing a rotation on the fore and aft axis of the airplane, and means adjacent the lower rear surface of the wings movable to affect the flow around the wings and over the ailerons.

29. In a floating aileron airplane construction, the combination of an airplane wing having a downflow over its upper surface, an auxiliary airfoil adapted to align itself with the airstream located above the same and rotatable about an axis transverse with respect to the longitudinal axis of the airplane and located substantially in the downflow, and a flap attached to the lower surface of the wing movable into lowered position to vary the flow around the wing and over at least a portion of the auxiliary airfoil.

30. In a floating aileron airplane construction comprising wings having downflow over their upper surfaces, separate detached floating ailerons so related to the wings as to affect the downflow over a sufficient area of the wings that there is produced a usable and practical rolling moment in addition to the rolling moment produced by the airfoil sections of the floating ailerons, and flaps movable into positions to affect the flow around the wings and the ailerons.

31. A floating aileron airplane construction comprising an airfoil having a downflow over its upper surface, a floating aileron so positioned above and with respect thereto as to affect the flow around the airfoil to give both positive and negative lift effect on said airfoil, depending upon angular movement of the floating aileron, which effect is additional to that of the airfoil sections of the aileron itself and increases the rolling moment of the aileron, and a flap located in the vicinity of the lower rear surface of the airfoil to affect the flow around the airfoil and over at least a portion of the aileron.

32. A floating aileron airplane construction comprising wings having downflow over their upper surfaces, a floating aileron so positioned above and with respect thereto as to affect the lift of each wing over a substantial portion of its surface, said floating ailerons being located above the wings and in the vicinity of the rear of the wings, and wing flaps located below and in the rear part of the wings movable into operative position to affect the flow around the wings and over the ailerons.

33. A floating aileron airplane construction comprising wings having downflow over their upper surfaces, a floating aileron so positioned above and with respect thereto as to affect the lift of each wing over a substantial portion of its surface, each floating aileron having its leading edge from approximately two aileron chords in front of the trailing edge of a wing to one aileron chord behind the trailing edge of the wing, and having its pivot located above the upper wing surface a distance of approximately one-third of an aileron chord to two aileron chords, and means located in the vicinity of the rear surface of the wings to affect the flow around the wings and over the ailerons.

34. A floating aileron airplane construction comprising wings having downflow over their upper surfaces, floating ailerons so positioned above and with respect thereto as to increase the downflow over the combination of one wing and its floating aileron on the side to be raised and to decrease the velocity of the airflow over the opposite sides, thereby producing a rotation on the fore and aft axis of the airplane, and means adjacent the lower rear surface of the wings movable to obstruct the flow around the wings to affect the downflow over the ailerons.

35. An airplane construction comprising wings having downflow over their upper surfaces, ailerons located thereabove and substantially in the downflow, and means under the wings to vary the downflow over the wings to affect the flow over the ailerons.

36. An airplane construction comprising wings having downflow over their upper surfaces, ailerons located thereabove and substantially in the downflow, and means under the wings laterally overlapping the ailerons to vary the downflow over the wings to affect the flow over the ailerons.

37. In an airplane construction, the combination of an airplane wing having a downflow over its upper surface, an auxiliary airfoil located above the same and substantially in the downflow thereover and rotatable about an axis transverse with respect to the longitudinal axis of the airplane, and a flap attached to the lower surface of the wing positioned to laterally overlap the auxiliary airfoil and movable into lowered position to vary the flow around the wing to vary the downflow over at least a portion of the auxiliary airfoil.

38. An airplane construction comprising an airfoil having a downflow over its upper surface, an aileron so positioned above and with respect thereto as to affect the flow around the airfoil to give both positive and negative lift effect on said airfoil, depending upon angular movement of the ailerons, which effect is in addition to that of the airfoil section of the aileron itself and increases the rolling moment produced by the aileron, and a flap located in the vicinity of the lower rear surface of the airfoil and laterally overlapping the aileron to affect the flow around the airfoil and over at least a portion of the aileron.

39. A floating aileron airplane construction comprising an airfoil having a downflow over its upper surface, a floating aileron so positioned above and with respect thereto as to affect the flow around the airfoil to give both positive and negative lift effect on said airfoil, depending upon angular movement of the aileron, which effect is in addition to that of the airfoil section of the aileron itself and increases the rolling moment produced by the aileron, and a flap located in the vicinity of the lower rear surface of the airfoil and laterally overlapping the aileron to affect the flow around the airfoil and over at least a portion of the floating aileron.

40. In a floating aileron airplane construction, the combination of an airplane wing having a downflow over its upper surface, an auxiliary airfoil adapted to align itself with the airstream located above the same and rotatable about an axis transverse with respect to the longitudinal axis of the airplane and having a substantial portion of its surface in the downflow over the wing, a flap attached to the lower rear surface of the wing to affect said downflow, and a hinged pivot for the flap located in the forward edge of said flap and adjacent the lower surface of the wing.

41. In a floating aileron airplane construction, the combination of an airplane wing having a downflow over its upper surface, an auxiliary airfoil adapted to align itself with the airstream located above the same and rotatable about an axis transverse with respect to the longitudinal axis of the airplane and having a substantial portion of its surface in the downflow over the wing, a flap attached to the lower rear surface of the wing to affect said downflow, and a hinged pivot for the flap located in the forward edge of said flap and within the wing.

42. An airplane construction comprising wings having downflow over their upper surfaces, floating ailerons adapted to float together located thereabove and substantially in the downflow, and means under the wings to vary the downflow over the wings to affect the flow over the ailerons.

43. An airplane construction comprising wings having downflow over their upper surfaces, floating ailerons adapted to float together located thereabove and substantially in the downflow, and means under the wings laterally overlapping the ailerons to vary the downflow over the wings to affect the flow over the ailerons.

44. In an airplane, wings having a downflow over their upper surfaces and the combination of long, relatively narrow ailerons so positioned with respect to the wings and in the downflow thereof as to affect the flow around them to give a usable and practical rolling moment in addition to that of the airfoil sections of the ailerons themselves, with wing flaps affecting the flow over the ailerons whose trailing edges in extended positions are adapted to lie substantially directly below the trailing edges of the wings.

45. An airplane construction comprising an airfoil having downflow, an aileron in the downflow thereof so positioned with respect thereto as to affect the lift of the airfoil over a substantial portion of its surface to increase or decrease the lift of the airfoil, in combination with a flap laterally overlapping the aileron which in extended positions has its trailing edge lying substantially adjacent the locus of perpendiculars to the datum lines of the airfoil sections and passing through the trailing edges of the airfoil.

46. In an airplane, the combination of wings having downflow thereover, movable wing flaps whose trailing edges in extended positions are adapted to lie in extended positions substantially directly below the trailing edge of the wings, and ailerons laterally overlapping the flaps substantially in the downflow over the wings and so positioned above the wings and with respect thereto as to affect the lift of each wing over a substantial portion of its surface, each aileron having its leading edge from approximately two aileron chords in front of the trailing edge of a wing to one aileron chord behind the trailing edge of the wing and having its pivot located above the upper wing surface a distance from approximately one-third of an aileron chord to two aileron chords.

47. In an airplane construction, the combination of wings having downflow thereover, and wing flaps whose trailing edges in extended positions lie substantially directly below the trailing edges of the wings, with ailerons laterally overlapping the flaps substantially in the downflow over the wings and so positioned above the wings and with respect thereto as to affect the lift of each wing over a substantial portion of its surface, each aileron having its leading edge from approximately two aileron chords in front of the trailing edge of a wing to one aileron chord behing the trailing edge of the wing and located sufficiently close to the upper surface of the wing as to affect the flow around the wing to give a usable and practical rolling moment in addition to that provided by the aileron alone.

48. An airplane construction comprising wings having downflow thereover, wing flaps located below the wings and near the rear thereof, means for moving the flaps into operative positions so that the trailing edges thereof shall lie substantially within the locus of lines drawn perpendicular to the datum lines of the wing sections and passing through the trailing edges of the wings, and separate detached ailerons laterally overlapping the flaps so related to the wings and substantially in the downflow thereof as to affect the flow over a sufficient area of the wings that there is produced a usable and practical rolling moment in addition to the rolling moment produced by the airfoil sections of the ailerons.

49. In an airplane construction, the combination of wings having downflow thereover with wing flaps operating with their trailing edges directly below the trailing edges of the wings, and relatively long narrow ailerons laterally overlapping the flaps substantially in the downflow over the wings so positioned above the wings and with relation thereto as to affect the flow around the wings sufficiently to give a usable and practical rolling moment in addition to that furnished by the ailerons alone.

50. In an airplane construction, the combination of an airplane wing having downflow thereover, an auxiliary airfoil located above the same and substantially in the downflow thereover, and rotatable about an axis transverse with respect to the longitudinal axis of the plane, and a flap affecting the flow over the auxiliary airfoil attached to the lower surface of the wing movable into lowered position to vary the flow around the wing, the trailing edge of the flap adapted in extended positions to lie substantially within the locus of lines perpendicular to the datum lines of the wing sections and passing through the trailing edge of the wing.

51. In an airplane construction the combination of an airplane wing having downflow thereover, a flap attached to the lower surface of the wing, a hinged pivot for the flap located in the forward edge of the flap and adjacent the lower surface of the wing, and means to extend the flap so that its trailing edge shall be substantially directly below the trailing edge of the wing, and an auxiliary airfoil laterally overlapping the flap located above the wing and at least partially in the downflow thereover and rotatable about an axis transverse with respect to the longitudinal axis of the airplane.

52. In air airplane construction, the combination of an airplane wing having downflow thereover, a movable flap whose trailing edge is adapted to lie directly below that of the wing in extended positions, and a relatively long, narrow aileron the flow over which is affected by the flap positioned above the wing and in the downflow thereover so that there shall be produced a rolling moment by reason of the change in lift coefficient of the wing, in addition to the rolling moment produced by the aileron per se.

53. In an airplane construction, the combination of an airplane wing having downflow thereover, an auxiliary airfoil located above the same and at least partially in the downflow, and rotatable about an axis transverse with respect to the longitudinal axis of the airplane, a flap attached to the lower surface of the wing and affecting the flow over the auxiliary airfoil, a hinged pivot for the flap located in the forward edge of said flap and within the wing, and means to extend the flap beyond the outlines of the wing surfaces so that the trailing edge of the flap shall lie substantially within the locus of lines drawn perpendicular to the datum lines of the wing sections and passing through the trailing edge of the wing.

54. An airplane comprising wings having downflow thereover, wing flaps when extended with their trailing edges directly below those of the wings, and ailerons laterally overlapping the flaps positioned above the wings and in the vicinity of their trailing edges, and substantially in the downflow thereover.

55. In an airplane, the combination of wings having downflow thereover, long relatively narrow floating ailerons adapted to float together and to seek positions of equilibrium with the forces of the airstream flowing over their surfaces, so positioned with respect to the wings and in the downflow as to affect the flow around them to give a usable and practical rolling moment in addition to that of the airfoil sections of the ailerons themselves, with wing flaps laterally overlapping the ailerons having their trailing edges directly below the trailing edges of the wings.

56. An airplane construction comprising an airfoil having downflow thereover, a floating aileron substantially in the downflow and so positioned with respect thereto as to affect the lift of the airfoil over a substantial portion of its surface to increase or decrease the lift of the airfoil, in combination with flaps affecting the flow over the aileron which are in extended positions having their trailing edges lying substantially adjacent the locus of perpendiculars to the datum lines of the wing sections and passing through the trailing edges of the wings.

57. In an airplane, the combination of wings having downflow thereover, movable wing flaps whose trailing edges are adapted to lie in extended positions directly below the trailing edges of the wings, and floating ailerons laterally overlapping the flaps adapted to float together substantially in the downflow and so positioned above the wings and with respect thereto as to affect the lift of each wing over a substantial portion of its surface, each aileron having its leading edge from approximately two aileron chords in front of the trailing edge of a wing to one aileron chord behind the trailing edge of the wing and having its pivot located above the upper wing surface a distance from approximately one-third of an aileron chord to two aileron chords.

58. In an airplane construction, the combination of wings having downflow thereover, and wing flaps adapted to operate with trailing edges directly below those of the wings, with ailerons laterally overlapping the flaps in the downflow over the wings which are adapted to seek positions of equilibrium with the forces of the airstream, so positioned above the wings and with respect thereto as to affect the lift of each wing over a substantial portion of its surface, each aileron having its leading edge from approximately two aileron chords in front of the trailing edge of a wing to one aileron chord behind the trailing edge of the wing and located sufficiently close to the upper surface of the wing as to affect the flow around the wing to give a usable and practical rolling moment in addition to that provided by the aileron alone.

59. An airplane construction comprising wings having downflow thereover, wing flaps located below the wings and near the rear thereof, means for moving the flaps into operative positions so that the trailing edges thereof shall lie substantially within the locus of lines drawn perpendicular to the datum lines of the wing sections and passing through the trailing edges of the wings, and separate detached ailerons of the floating type laterally overlapping the flaps located substantially in the downflow over the wings and so related to the wings as to affect the flow over a sufficient area of the wings that there is produced a usable and practical rolling moment in addition to the rolling moment produced by the airfoil sections of the ailerons.

60. In an airplane construction, the combination of wings having downflow thereover with wing flaps having trailing edges when extended directly below the trailing edges of the wings, and relatively long narrow floating ailerons laterally overlapping the flaps adapted to float together located substantially in the downflow and so positioned above the wings and with relation thereto as to affect the flow around the wings sufficiently to give a usable and practical rolling moment in addition to that furnished by the ailerons alone.

61. In an airplane construction, the combination of an airplane wing having downflow thereover, an auxiliary airfoil located above the same and in the downflow thereover and rotatable about an axis transverse with respect to the longitudinal axis of the plane, said airfoil being adapted to float freely in the airstream except when under operative control of the pilot, and a flap affecting the flow over the auxiliary airfoil attached to the lower surface of the wing movable into lowered position to vary the flow around the wing, the trailing edge of the flap adapted in extended positions to lie substantially within the locus of lines perpendicular to the datum lines of the wing sections and passing through the trailing edge of the wing.

62. In an airplane construction, the combination of an airplane wing, having downflow thereover, a flap attached to the lower surface of the wing, a hinged pivot for the flap located in the forward edge of the flap and adjacent the lower surface of the wing, and means to extend the flap so that its trailing edge shall be substantially directly below the trailing edge of the wing, and an auxiliary airfoil laterally overlapping the flap located above the wing and substantially in the downflow thereover and rotatable about an axis transverse with respect to the longitudinal axis of the airplane, said airfoil being adapted to float in the airstream except when under operative control of the pilot.

63. In an airplane construction, the combination of an airplane wing having downflow thereover, a movable flap whose trailing edge is adapted to lie in extended positions directly below that of the wing, and a relatively long, narrow floating aileron laterally overlapping the flap positioned above the wing and in the downflow so that there shall be produced a rolling moment by reason of the change in lift coefficient of the wing, in addition to the rolling moment produced by the aileron per se.

64. In an airplane construction, the combination of an airplane wing having downflow thereover, an auxiliary airfoil in the downflow thereover and adapted to seek positions of equilibrium with the forces of the airstream over its surface located above the same and rotatable about an axis transverse with respect to the longitudinal axis of the airplane, a flap affecting the flow over the auxiliary airfoil attached to the lower surface of the wing, a hinged pivot for the flap located in the forward edge of said flap and within the wing, and means to extend the flap beyond the outlines of the wing surfaces so that the trailing edge of the flap shall lie substantially within the locus of lines drawn perpendicular to the datum lines of the wing sections and passing through the trailing edge of the wing.

65. In an airplane, wings having downflow thereover, wing flaps whose trailing edges are directly below those of the wing, and long narrow floating ailerons laterally overlapping the flaps above the wings and substantially in the downflow and in the vicinity of their trailing edges which are adapted to change the lift coefficients of the wings to produce rolling moments.

66. In an airplane, a wing having a downflow area thereover, a flap movable to increase the lift of the wing and flap combination, said flap extending over substantially the total length of the wing, and an aileron mounted over the wing and substantially in the downflow thereover and overlapping the flap laterally.

EDWARD F. ZAPARKA.